(12) United States Patent
Blunk et al.

(10) Patent No.: US 9,123,921 B2
(45) Date of Patent: Sep. 1, 2015

(54) HYDROLYTICALLY-STABLE HYDROPHILIC COATINGS FOR PEMFC BIPOLAR PLATE

(75) Inventors: Richard H. Blunk, Macomb Township, MI (US); Feng Zhong, Troy, MI (US); Darren R. Dunphy, Albuquerque, NM (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 12/119,786

(22) Filed: May 13, 2008

(65) Prior Publication Data

US 2009/0286132 A1 Nov. 19, 2009

(51) Int. Cl.
*H01M 8/06* (2006.01)
*H01M 8/02* (2006.01)

(52) U.S. Cl.
CPC .......... *H01M 8/0247* (2013.01); *H01M 8/0215* (2013.01); *H01M 8/0228* (2013.01); *H01M 8/0258* (2013.01); *Y02E 60/50* (2013.01)

(58) Field of Classification Search
USPC ............. 429/94, 34, 161, 162, 40, 30, 41, 42, 429/17, 223, 38, 343
See application file for complete search history.

(56) References Cited

U.S. PATENT DOCUMENTS

| | | | |
|---|---|---|---|
| 4,175,165 A * | 11/1979 | Adlhart | 429/457 |
| 4,500,657 A * | 2/1985 | Kumar | 522/81 |
| 5,942,347 A * | 8/1999 | Koncar et al. | 429/30 |
| 6,348,269 B1 * | 2/2002 | Terry | 428/447 |
| 6,649,031 B1 * | 11/2003 | Iqbal et al. | 204/192.15 |
| 2003/0022052 A1 * | 1/2003 | Kearl | 429/34 |
| 2004/0237833 A1 * | 12/2004 | Sepeur et al. | 106/13 |
| 2005/0147832 A1 * | 7/2005 | Okai et al. | 428/447 |
| 2006/0105222 A1 * | 5/2006 | Abd Elhamid et al. | 429/38 |
| 2006/0280992 A1 * | 12/2006 | Miyagawa | 429/34 |

FOREIGN PATENT DOCUMENTS

WO WO 9920705 A1 * 4/1999

OTHER PUBLICATIONS

Mitsubishi International Corp., Product Web Site, Author Unknown, "Silane Coupling Agents," Archived to Oct. 2005.*
van Ooij, W.J., "Protecting Metals with Silane Coupling Agents," Chemtech, Feb. 1998, pp. 26-35.
Kickelbick, Guido, "Inorganic-Organic Hybrid Materials," Fundamentals of Sol-gel Technology, Sep. 1, 2007, 56 pgs.
Safety Data Sheet, revised Aug. 3, 2005, printed Aug. 19, 2005, 3 pgs.

* cited by examiner

*Primary Examiner* — Eli Mekhlin

(74) *Attorney, Agent, or Firm* — Brooks Kushman P.C.

(57) ABSTRACT

Bipolar plates useful for fuel cell applications include a plate body having a channel-defining surface that is at least partially coated with a hydrophilic layer. This hydrophilic layer comprises residues of a silane-coupling agent in a sufficient amount such portions of the first hydrophilic layer have a contact angle less than a predetermined value.

20 Claims, 6 Drawing Sheets

HYDROLYTICALLY-STABLE HYDROPHILIC COATINGS FOR PEMFC BIPOLAR PLATE

BACKGROUND OF THE INVENTION

1. Field of the Invention

The present invention is related to bipolar plates with improved hydrophilicity for fuel cell applications.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form (O2) or air (a mixture of O2 and N2). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, it is desirable to minimize the agglomeration of water droplets within flow channels in the plates. To this end, fuel cells are typically coated with a hydrophilic coating. Currently, hydrophylic layers are applied to a conductive plate via a multilayer adhesion process. Typically, such processes require a 4 dip cycles in a hydrophilic coating such as NANOX™. Although such processes work reasonably well, multilayer adhesion methods are undesirably labor intensive often taking up to 40 minutes to complete.

Accordingly, there is a need for improved methodology for applying hydrophilic coatings at the surfaces of bipolar plates used in fuel cell applications.

SUMMARY OF THE INVENTION

The present invention solves one or more problems of the prior art by providing in at least one embodiment, bipolar plates that are useful in fuel cell applications. The bipolar plates include a plate body having channel-defining surface that is at least partially coated with a hydrophilic layer. This hydrophilic layer comprises residues of a silane-coupling agent in a sufficient amount such that portions of the first hydrophilic layer have a contact angle less than a predetermined value.

In another embodiment of the present invention, the bipolar plates include a second hydrophilic layer disposed over the first hydrophilic layer.

DETAILED DESCRIPTION OF THE PREFERRED EMBODIMENT(S)

Figure 1:
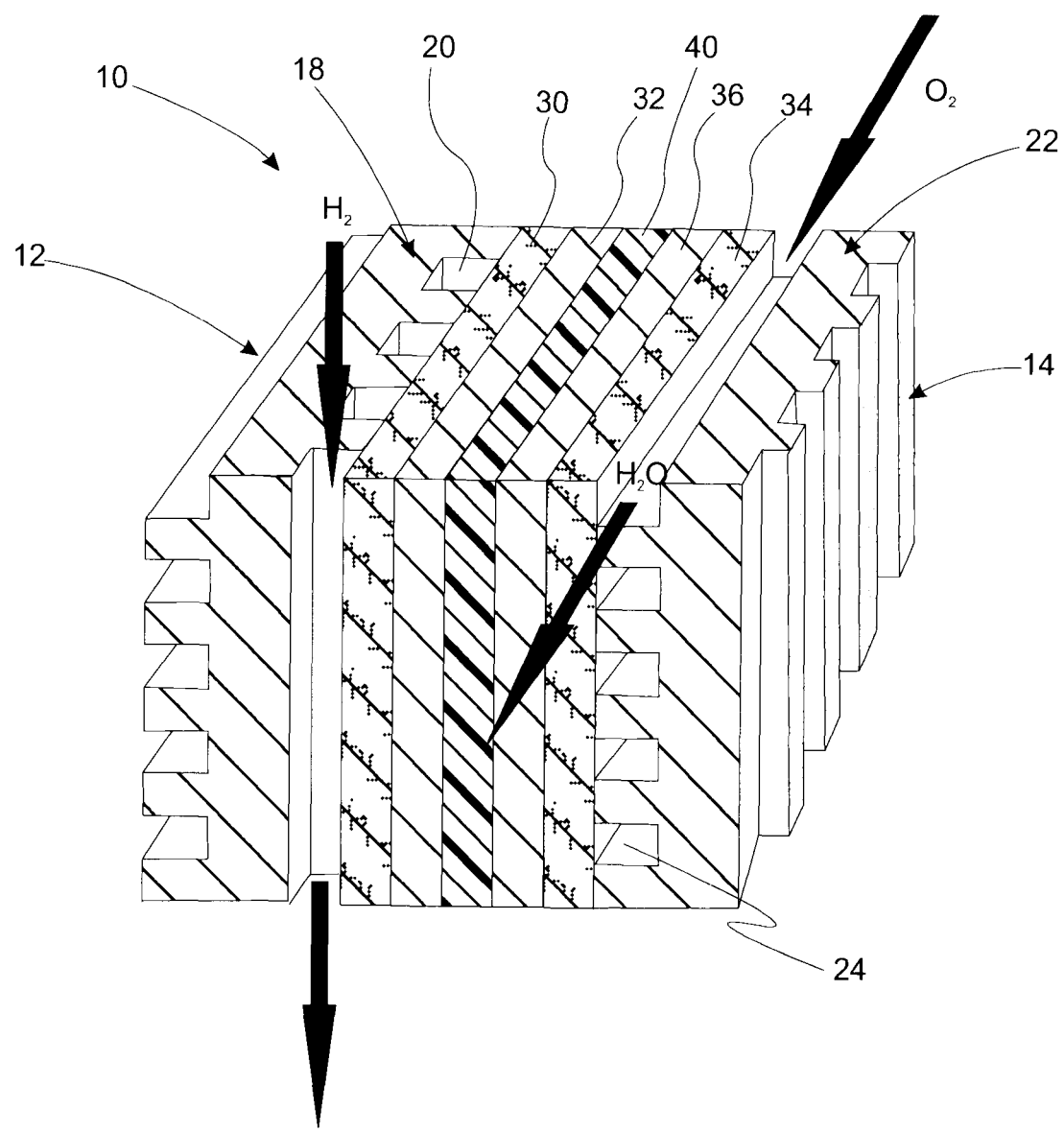
FIG. 1 is a perspective view of a fuel cell incorporating the bipolar plates of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a perspective view of a fuel cell incorporating the bipolar plates of the present embodiment is provided. PEM fuel cell 10 includes bipolar plates 12, 14. Within bipolar plate 12, anode flow field 18 includes one or more channels 20 for introducing a first gas to the fuel cell 10. Similarly, bipolar plate 14 includes cathode gas flow field 22, which includes one or more channels 24 for introducing a second gas into fuel cell 10. Typically, the first gas includes a fuel such as hydrogen while the second gas includes an oxidant such as oxygen. Anode diffusion layer 30 is positioned between anode flow field 18 and anode layer 32 while cathode diffusion layer 34 is positioned between cathode flow field 22 and cathode layer 36. Polymeric ion conductive membrane 40 is interposed between anode layer 32 and cathode layer 36.

Figure 2:
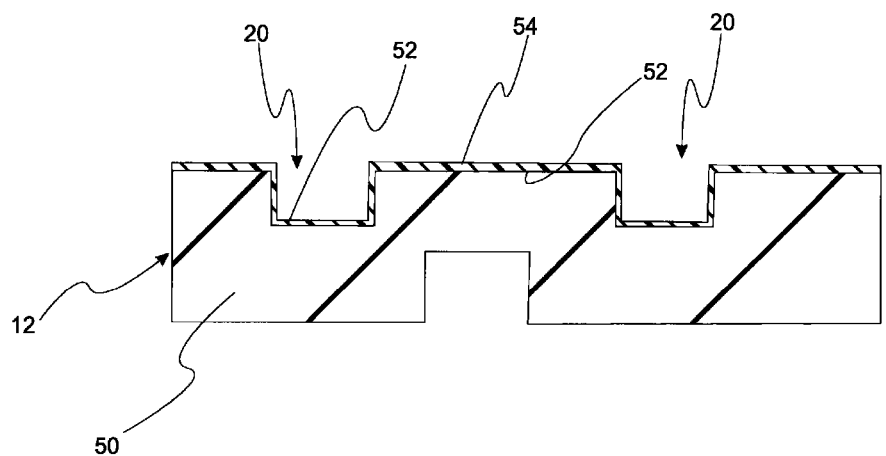
FIG. 2 is a schematic illustration of a variation of the bipolar plates of the invention.

With reference to FIG. 2, a schematic illustration of a variation of the bipolar plates of the invention is provided. Bipolar plate 12 includes plate body 50 having channel-defining surface 52. First hydrophilic layer 54 is disposed over at least a portion of surface 54 of plate body 50. First layer 54 comprises residues of a silane-coupling agent. In a refinement of the present embodiment, the residues of a silane-coupling agent are in a sufficient amount such that portions of channel-defining surface 52 coated with first layer 54 have a contact angle less than a predetermined value (when uncoated). In another refinement, the contact angle is less than about 60 degrees. In yet another refinement, the contact angle is less than about 30 degrees. In still another refinement, the contact angle is less than about 15 degrees.

Still referring to FIG. 2, channel-defining surface 52 defines fluid flow channels 20 configured to distribute flow of a fluid across at least one side of the plate 12. As such, in a variation of the present embodiment at least a portion of first layer 54 is not coated with any addition layers. In particular, these uncoated regions are advantageously located within flow channels 20 in order to prevent agglomeration of water in the flow channels.

Figure 3:
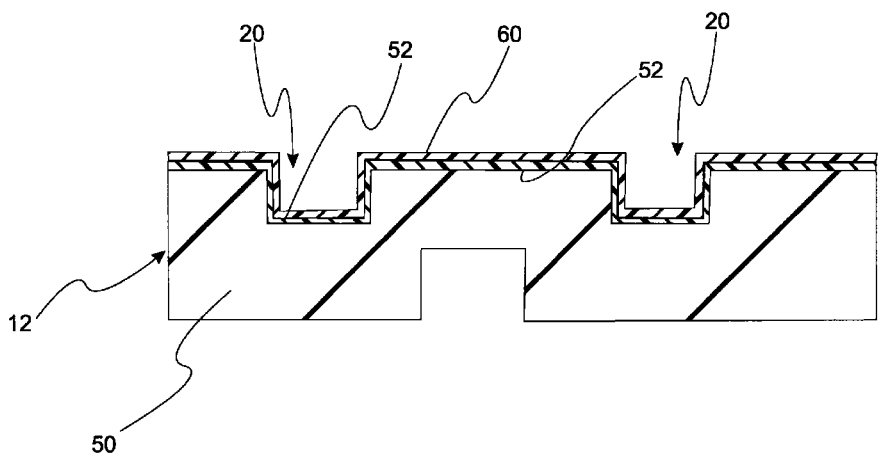
FIG. 3 is a schematic illustration of another variation of the bipolar plates of the invention.

In another variation of the present embodiment as depicted in FIG. 3, bipolar plate 12 further comprises second layer 60 disposed over first layer 54. In this variation, surfaces coated with second hydrophilic layer 60 have a contact angle less than about 15 degrees (when not coated with additional layers). In this variation, at least a portion of second layer 60 is not coated with any addition layers. In particular, these uncoated regions are advantageously located within flow channels 20 in order to prevent agglomeration of water in the flow channels. Each of the variations depicted in FIGS. 2 and 3 include first layer 54. In a refinement of the present variation, second layer 60 includes residues of a colloidal silica. Suitable materials for the colloidal silica of second layer 60 include the NANOX™ line commercially available from Nano-X, Gmbh located in Saarbruecken, Germany.

Figure 4:
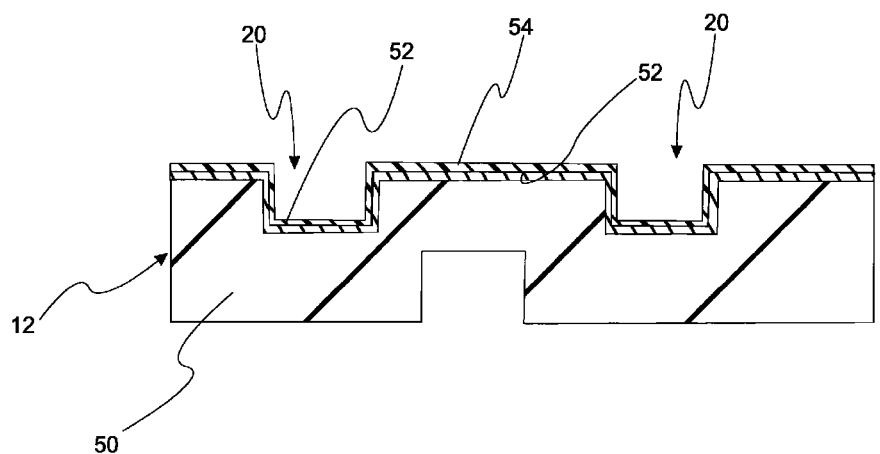
FIG. 4 is a schematic illustration of still another variation of the bipolar plates of the invention.
Figure 5:
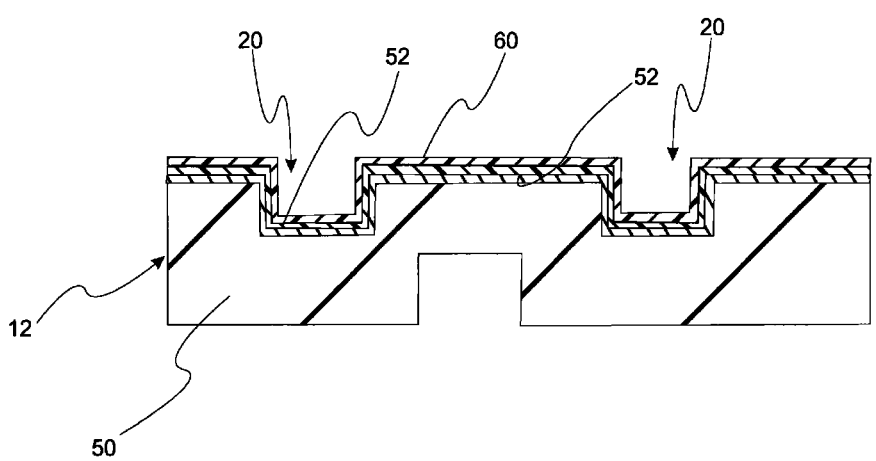
FIG. 5 is a schematic illustration of yet another variation of the bipolar plates of the invention.

With reference to FIGS. 4 and 5, additional variations of the present embodiment are provided. In each of these variations, bipolar plate 12 further includes conductive coating 62 disposed between bipolar plate 12 and first hydrophilic layer 54.

In another refinement of these variations, the silane coupling agent has formula I:

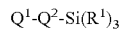
$$Q^1\text{-}Q^2\text{-}Si(R^1)_3 \qquad \qquad I$$

wherein:

$R^1$ is a chemical moiety that can be hydrolyzed and polymerized using sol-gel chemistry. In a refinement, $R^1$ is an alkoxy or halogen. In another refinement, $R^1$ is a C1-6 alkoxy or chlorine.

$Q^1$ is a moiety having one or more atoms that hydrogen bond or have energetically favorable interactions with water such that a surface treated with the coupling agent is hydrophilic with a contact angle within the ranges cited herein; and $Q^2$ is a hydrocarbon-containing moiety providing a spatial separation between $Q^1$ and the $Si(R^1)_3$ group. In one refinement, $Q^2$ includes alkanes, aromatic rings, amines, ethers, and polymers. Optionally, $Q^2$ is further substituted with additional reactive Si groups or with non-reactive chemical moieties.

In another variation of the present invention, the silane coupling agent has formula II:

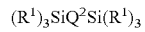
$$(R^1)_3SiQ^2Si(R^1)_3 \qquad \qquad II$$

wherein:

$R^1$ is a chemical moiety that can be hydrolyzed and polymerized using sol-gel chemistry. In a refinement, $R^1$ is an alkoxy or halogen. In another refinement, $R^1$ is a $C_{1-6}$ alkoxy or chlorine; and $Q^2$ is a hydrocarbon-containing moiety providing a spatial separation between $Q^1$ and the $Si(R^1)_3$ group. In one refinement, $Q^2$ includes alkanes, aromatic rings, amines, ethers, and polymers. Optionally, $Q^2$ is further substituted with additional reactive Si groups or with non-reactive chemical moieties. Typically, $Q^2$ is linked to the silicon centers through C—Si or O—Si bonding.

In another variation of the present invention, the silane coupling agent is selected from the group of compounds having formulae III-VII:

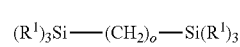
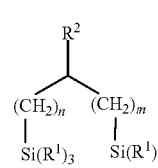

VII

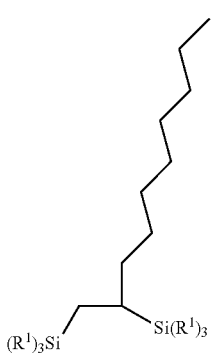

wherein:
R¹ is the same as set forth above;
X is a halogen. In a particularly useful refinement, X is Cl;
m, n, and o are each independently an integer from 0 to 10. In a refinement, m, n, and o are each independently an integer from 0 to 5. In still another embodiment, m, n, and o are each independently an integer from 0 to 3.

Examples of useful silane coupling agents that have additional functional groups in the linker Q¹ are provided in formulae VIII-XI:

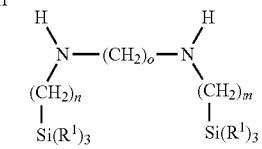
VIII

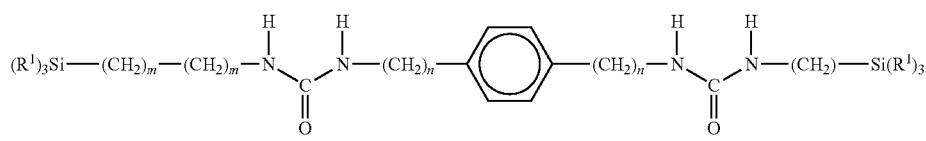
IX

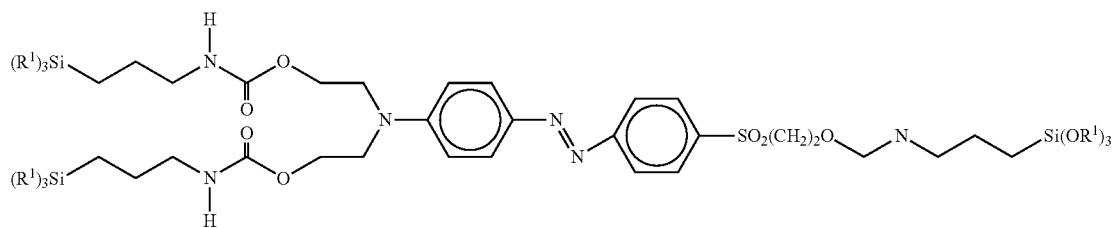
X

XI

In still another variation of the present invention, the silane coupling agent Is described by formula XII:

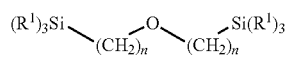
XII wherein:
R¹ is the same as set forth above; and
n is integer from 0 to 10.

Figure 6A:
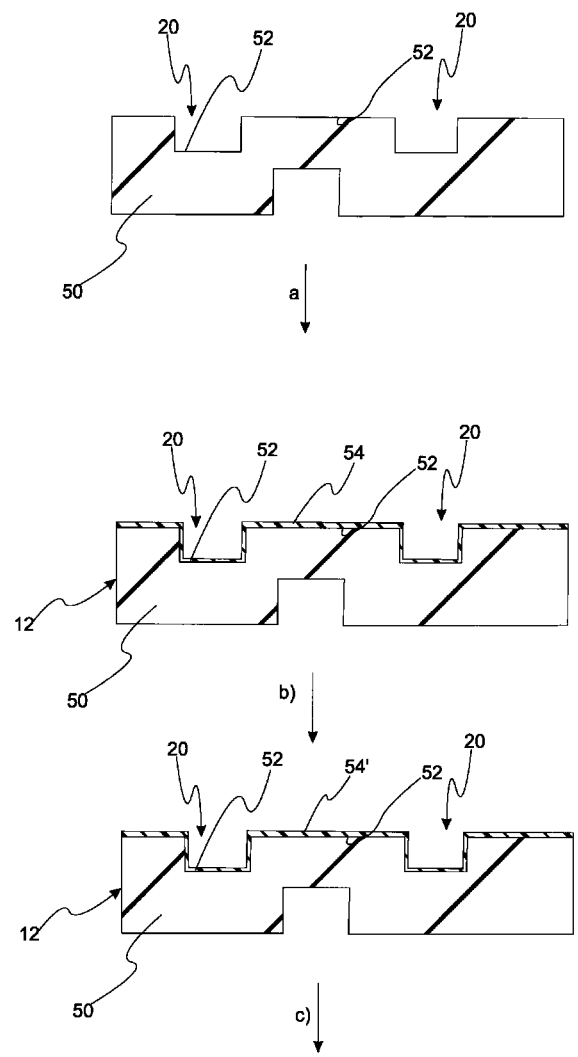
FIGS. 6A and 6B provide a flowchart illustrating the preparation bipolar plates having a hydrophilic coating.
Figure 6B:
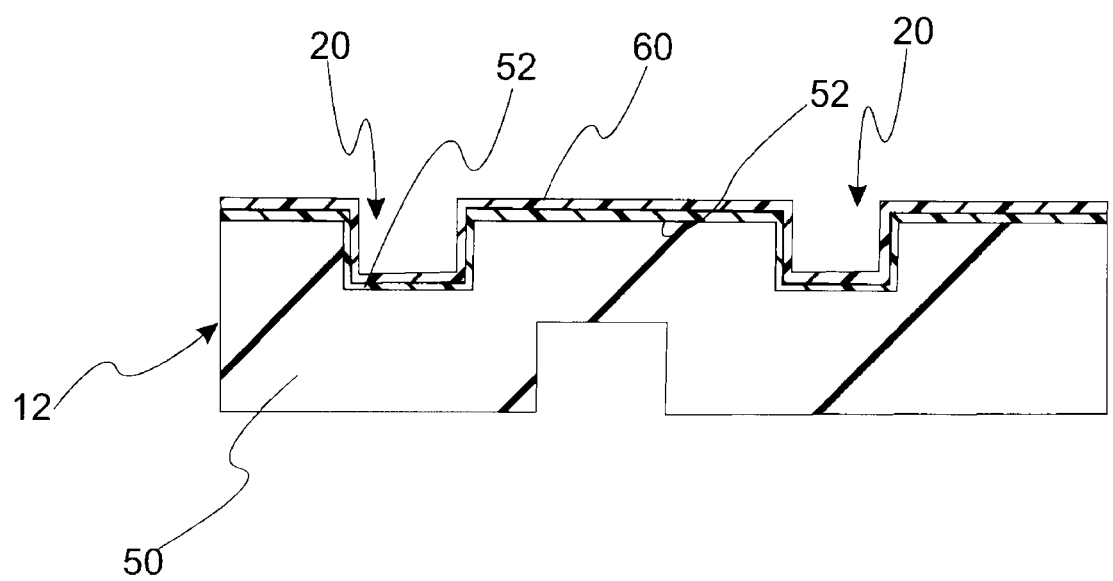

With reference to FIG. 6, a method of forming the bipolar plate described above is provided. Plate body 50 includes channel-defining surface 52, which defines channels 20. In step a), plate body 50 is contacted with a silane coupling agent and then cured to form unactivated first layer 54 on plate body 50. In a variation of the present embodiment, first layer 54 is then contacted with an acid composition to form activated first coating 54' is step b). Although the present invention is not dependent upon any particular mechanism, it is believed that in this activation step condensed and hydrophobic siloxane groups at the exposed surface of first coating 54 surface are hydrolyzed to hydrophilic silanol groups. In another variation of the present embodiment, the structure depicted in FIG. 3 or 5 is formed by coating activated first coating 54 with second layer 60 as set forth in step c). In this variation, the activation of step b) when performed, is believed to assist in producing a durable covalent bond between the silanol groups on the first layer and silanol groups in the second layer. In this second variation, second layer 60 is a hydrophilic layer when incorporated into a fuel cell.

The following examples illustrate the various embodiments of the present invention. Those skilled in the art will recognize many variations that are within the spirit of the present invention and scope of the claims.

1. Large plate fuel cell testing

BTSE is dip coated onto large Au-coated stainless steel plates at a dipping speed of 12 in/min. Based on ellipsometer measurements, the BTSE film is less than 50 nm thereby ensuring a negligible increase in electrical contact resistance ("CR") between the BTSE coating on the plate lands and the gas diffusion layer ("GDL") in the test fuel cells. The CR resistance was 10 to 12 mohm m² (GDL-to-GDL, 200 psi, GDL=Toray TGP-H-1.0T). This value is substantially identical to that for Au coating only. The BTSE coating is cured/condensed at 100° C. for 10 minutes at an initial static contact angle (CA) ranging from 50 to 70 degrees. This contact angle is observed not to enable water imbibition into the flow channels.

The coating on the plates are activated in an acidified water bath (pH=2) for 12 hours in order to reduce its CA to 20 to 25 degrees and, in turn, enable channel imbibition. After activating the BTSE coating, the plates are dipped into a silica sol bath at room temperature and coated with colloidal silica (xtec 3408 from Nano-X GmbH). The Nano-X is then dried at room temperature for 30 minutes. The plates were inserted into a fuel cell stack for durability testing. The plates at this point have CA<10 degrees. After 1000 hrs of fuel cell testing there is substantially no loss in hydrophilicity.

2. Long term hydrophilicity testing

Au is electroplated onto both sides of stainless steel (316L) coupons to a thickness of 20 to 25 nm. The Au-coated stainless steel coupons are wiped with isopropyl alcohol (IPA), soaked in an alkaline bath (simple green) for 5 minutes, and rinsed with deionized (DI) water. BTSE is spin-coated (4000 rpm) to a thickness of 30 nm on one side of the Au-coated coupons. The coating is cured at 100° C. for 4 hours and activated at room temperature in water (pH 3) for 3 days. Once activated, the CA is reduced from 60 to 21 degrees.

The activated BTSE/Au/stainless steel coupons are dipped into Nano-X at room temperature and dried for 30 minutes in air to give NANOX™/BTSE/Au films on one side of the coupon and NANOX™/Au films on the other.

Au-coated stainless steel coupons are also coated with NANOX™ using the layer-by-layer adsorption (LBL) or multilayer adsorption (MLA) process as described in patent application # GP308003. Cytec Superfloc C-442 (cationic polyacrylamide, 0.35 g/li in 0.05 M sulfuric acid) and NANOX™ diluted to 10% volume in 50/50 DI water/ethanol are used. A 4-dip and an 8-dip process are used to prepare samples with different thicknesses of silica. A 1-dip process entails coupon immersion in the polymer bath for 3 minutes, followed by DI water rinsing for 2 minutes, immersion in the NanoX bath for 3 minutes, and rinsing again with DI water.

Figure 7:
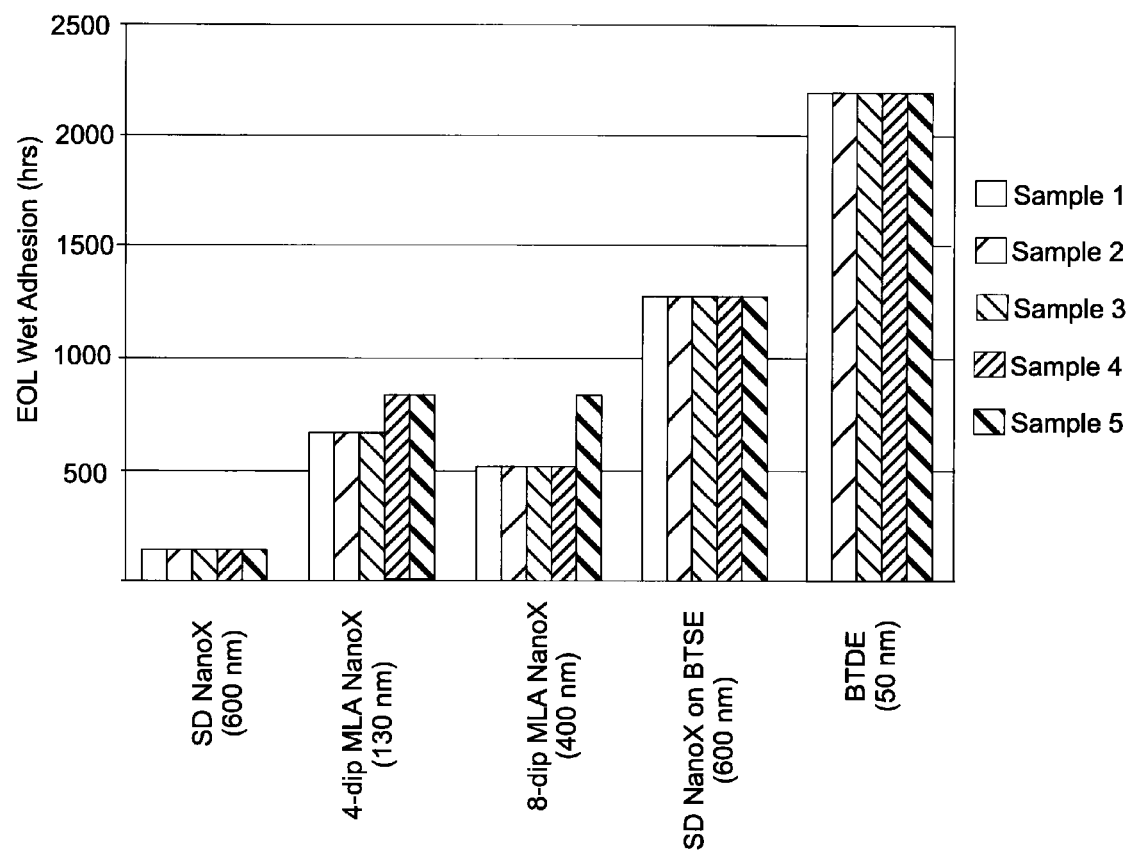
FIG. 7 is a bar chart showing the ability of the present invention to retain hydrophilicity as compared to alternative coating technologies.

All samples are soaked in DI water at 80° C. and evaluated for hydrophilicity retention. Samples are taken out of the water containers at the following times: 132 hours, 336 hours, 504 hours, 672 hours, 840 hours, 1008 hours, 1176 hours, and 1269 hours, and their static contact angles are measured. The criterion for end of life ("EOL") is when the static contact angle exceeds 10 degrees. The results of these experiments are set forth in FIG. 7 which EOL.

3. Preparation of BTSE working solution

A mixture of 6.0 ml ethanol, 0.72 ml water, 4.65 ml BTSE, and 0.125 ml 0.5 M sulfuric acid is aged at room temperature for about 20 minutes to form a stock solution. This composition is then mixed with 12 ml 0.08% conc. sulfuric acid in ethanol for consistency and stabilization, and 0.51 ml of the stock solution to form a working solution. The working composition is then aged for an additional 20 minutes. The pH of this solution is about 2.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An electrically conductive bipolar plate for incorporation into a fuel cell, the bipolar plate comprising:
   a plate body having a channel-defining surface; and
   an activated first layer disposed over at least a portion of the channel-defining surface of the plate body, the activated first layer comprising residues of a silane coupling agent in a sufficient amount such that portions of the channel-defining surface coated with the first activated layer have a contact angle less than a predetermined value, the activated first layer made by a method comprising:
   a) contacting the plate body with the silane coupling agent;
   b) curing the silane coupling agent to form an unactivated first layer on the plate body; and
   c) contacting the unactivated first layer with an acid composition to form the activated first layer
   wherein the silane coupling agent has formula I:

$$Q^2\text{-}Q^1\text{-}Si(R^1)_3 \qquad\qquad I$$

wherein:
   $R^1$ is an alkoxy or a halogen;
   $Q^1$ is a hydrocarbon-containing moiety providing a spatial separation between $Q^1$ and the $Si(R^1)_3$ group; and
   $Q^2$ is a moiety having one or more atoms that hydrogen bond or have energetically favorable interactions with water.

2. The bipolar plate of claim 1 wherein the activated first layer is a hydrophilic layer.

3. The bipolar plate of claim 2 wherein the contact angle is less than about 60 degrees.

4. The bipolar plate of claim 2 wherein the contact angle is less than about 30 degrees.

5. The bipolar plate of claim 1 wherein the channel-defining surface defines a set of fluid flow channels configured to distribute flow of a fluid across at least one side of the plate body.

6. The bipolar plate of claim 1 further comprising a second layer disposed over the activated first layer, the second layer being a hydrophilic layer.

7. The bipolar plate of claim 6 wherein the surface coated with the second layer has a contact angle less than about 15 degrees.

8. The bipolar plate of claim 1 wherein the activated first layer includes residues of a colloidal silica.

9. The bipolar plate of claim 1 wherein the silane coupling agent has formula II:

$$(R^1)_3SiQ^2Si(R^1)_3 \qquad\qquad II.$$

10. The bipolar plate of claim 9 wherein the silane coupling agent is bis-1,2-(triethoxysilyl)ethane ("BTSE").

11. The bipolar plate of claim 1 wherein the silane coupling agent has one or more of the following formulae:

$$(R^1)_3Si\text{---}(CH_2)_o\text{---}Si(R^1)_3 \qquad\qquad III$$

$$X\text{---}(CH_2)_o\text{---}Si(OR^1)_3 \qquad\qquad IV$$

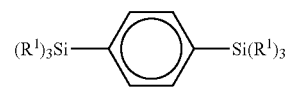

V

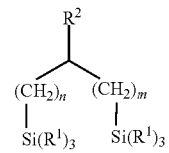

VI

-continued

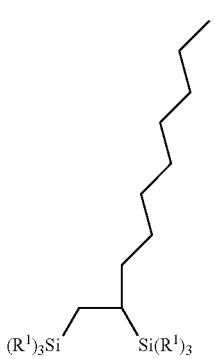

VII wherein:
X is a halogen; and
m, n, and o are each independently an integer from 0 to 10.

12. The bipolar plate of claim 1 wherein the silane coupling agent has one or more of the following formulae:

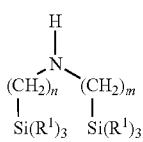

VIII

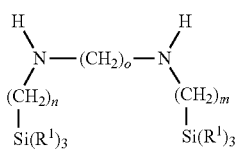

IX

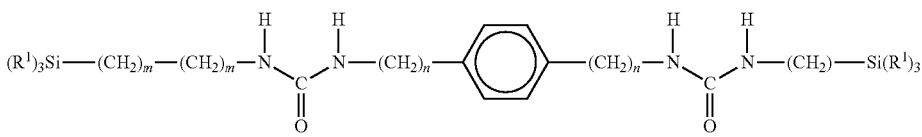

X

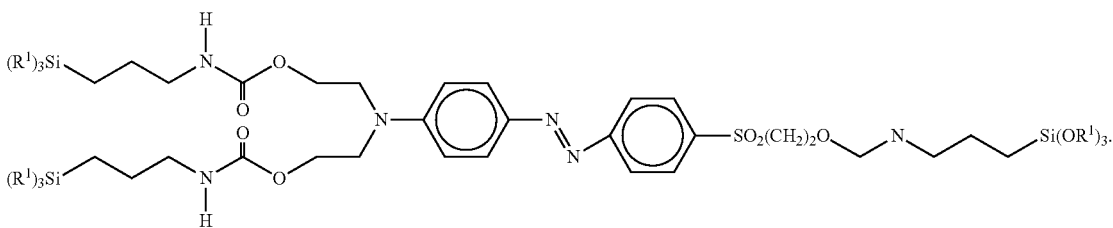

XI

13. The bipolar plate of claim 1 wherein the silane coupling agent has the following formula:

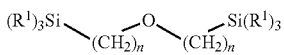

XII wherein:
$R^1$ is an alkoxy or a halogen; and
n is integer from 0 to 10.

14. The bipolar plate of claim 1 wherein a conductive coating is disposed between the bipolar plate and the activated first layer.

15. A fuel cell comprising the bipolar plate of claim 1.

16. An electrically conductive bipolar plate for incorporation into a fuel cell, the bipolar plate comprising:
a metal plate body having a channel-defining surface;
a first hydrophilic layer disposed over at least a portion of the channel-defining surface of the plate body, the first hydrophilic layer comprising residues of a silane coupling agent; and
a second hydrophilic layer disposed over the first hydrophilic layer, wherein portions of the plate body covered by the first and second hydrophilic layers have a contact angle less than about 20 degrees wherein the silane coupling agent has formula I:

$$Q^2Q^1\text{-Si}(R^1)_3 \qquad \text{I}$$

wherein:
$R^1$ is an alkoxy or a halogen;
$Q^1$ is a hydrocarbon-containing moiety providing a spatial separation between $Q^1$ and the $\text{Si}(R^1)_3$ group; and
$Q^2$ is a moiety having one or more atoms that hydrogen bond or have energetically favorable interactions with water.

17. The bipolar plate of claim 16 wherein the second hydrophilic layer includes moieties that hydrogen bond.

18. The bipolar plate of claim 16 wherein the silane coupling agent has formula II:

$$(R^1)_3\text{SiQ}^2\text{Si}(R^1)_3 \qquad \text{II.}$$

19. The bipolar plate of claim 18 wherein the silane coupling agent is bis-1,2-(triethoxysilyl)ethane ("BTSE").

20. An electrically conductive bipolar plate for incorporation into a fuel cell, the bipolar plate comprising:
a plate body having a channel-defining surface; and
an activated first layer disposed over at least a portion of the channel-defining surface of the plate body, the activated first layer comprising residues of a silane coupling agent such that portions of the channel-defining surface coated with the activated first layer have a contact angle less than a predetermined value, wherein the silane coupling agent has formulae III, IV, V, VI or VII:

$$(R^1)_3\text{Si}-(CH_2)_o-\text{Si}(R^1)_3 \qquad \text{III,}$$

$$X-(CH_2)_o-\text{Si}(OR^1)_3 \qquad \text{IV,}$$

wherein:
R¹ is an alkoxy or a halogen;
X is a halogen; and
m, n, and o are each independently an integer from 0 to 10.
* * * * *